(12) United States Patent
Bitauld et al.

(10) Patent No.: US 9,885,938 B2
(45) Date of Patent: Feb. 6, 2018

(54) OPTICAL BEAMS

(71) Applicant: Nokia Technologies Oy, Espoo (FI)

(72) Inventors: David Bitauld, Cambridge (GB); Antti Niskanen, Cambridge (GB)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/907,665

(22) PCT Filed: Jul. 30, 2013

(86) PCT No.: PCT/IB2013/056258
§ 371 (c)(1),
(2) Date: Jan. 26, 2016

(87) PCT Pub. No.: WO2015/015249
PCT Pub. Date: Feb. 5, 2015

(65) Prior Publication Data
US 2016/0170287 A1    Jun. 16, 2016

(51) Int. Cl.
*G02F 1/295* (2006.01)
*G02F 1/29* (2006.01)
*H04B 10/114* (2013.01)

(52) U.S. Cl.
CPC ........... *G02F 1/2955* (2013.01); *G02F 1/29* (2013.01); *H04B 10/1143* (2013.01); *G02F 2001/291* (2013.01); *G02F 2001/294* (2013.01); *G02F 2203/15* (2013.01)

(58) Field of Classification Search
CPC ....... B82Y 20/00; G02F 1/225; G02F 1/2955; G02F 1/295; G02B 6/12007; G02B 6/1225
See application file for complete search history.

(56) References Cited

U.S. PATENT DOCUMENTS

| 5,187,487 A * | 2/1993 | Riza .............................. 342/372 |
| 6,128,421 A | 10/2000 | Roberts |
| 2011/0052114 A1 | 3/2011 | Bernasconi et al. |
| 2011/0222814 A1 | 9/2011 | Krill et al. |
| 2012/0026297 A1 * | 2/2012 | Sato ............................... 348/47 |

FOREIGN PATENT DOCUMENTS

| CN | 102073186 | 5/2011 |
| GB | 2499693 | 8/2013 |

OTHER PUBLICATIONS

International Search Report and Written Report received for corresponding Patent Cooperation Treaty Application No. PCT/IB2013/056258, dated Mar. 6, 2014, 14 pages.
(Continued)

Primary Examiner — Jennifer Doan
(74) Attorney, Agent, or Firm — Harrington & Smith

(57) ABSTRACT

Apparatuses and methods for producing and/or receiving an optical beam are disclosed, A phased array on a chip comprises phase shifters and off-chip couplers to provide phase controlled pixels. An optical system is arranged in front of the phased array. The optical system is configured to concentrate light from the phased array and/or expand a received beam of light for input into the phased array.

13 Claims, 12 Drawing Sheets

(56) References Cited

OTHER PUBLICATIONS

Doylend J.K. et al. Hybrid silicon free-space source with integrated beam steering. In Silicon Photonics VIII. San Francisco, CA USA. Proceedings of the SPIE—The International Society for Optical Engineering, 2013, vol. 8629, p. 862911-862919.
Weihua Guo et al. *Two-Dimensional Optical Beam Steering With InP-Based Photonic Integrated Circuits* IEEE Journal of Selected Topics in Quantum Electronics, IEEE Service Center, Piscataway, NJ, US, vol. 19. No. 4, Jul. 1, 2013, p. 6100212, XP011508632.
Matthew T. Johnson et al. *High-Speed Beam Steering With Phased Vertical Cavity Laser Arrays* IEEE Journal of Selected Topics in Quantum Electronics, IEEE Service Center, Piscataway, NJ, US, vol. 19, No. 4, Jul. 1, 2013, p. 1701006, XP011508651.
Choquette K D et al. *Beam Steering in Photonic Crystal Vertical Cavity Semiconductor Laser Arrays* 2006 IEEE Aerospace Conference; Big Sky, Montana; Mar. 4-11, 2006, IEEE Operations Center, Piscataway, NJ, Mar. 4, 2006, pp. 1-7, XP010928562.

\* cited by examiner

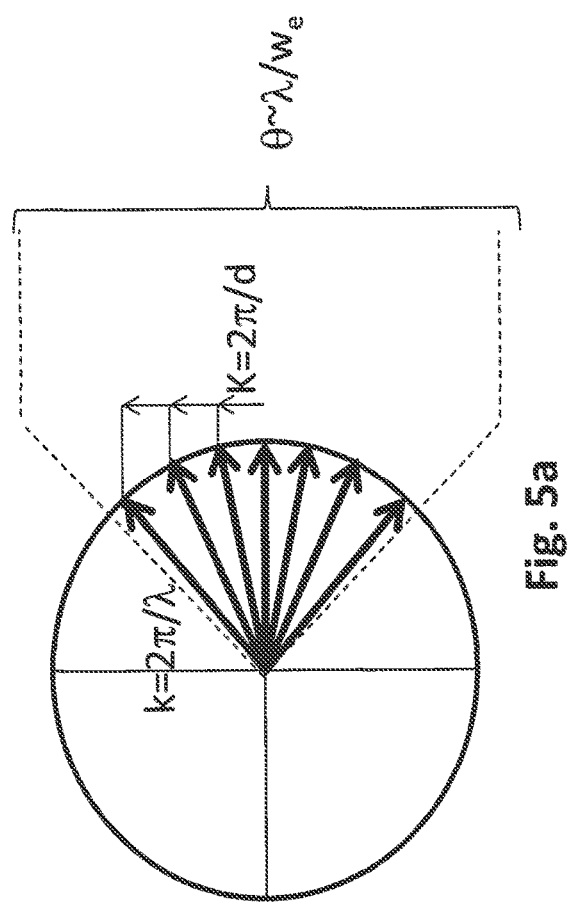
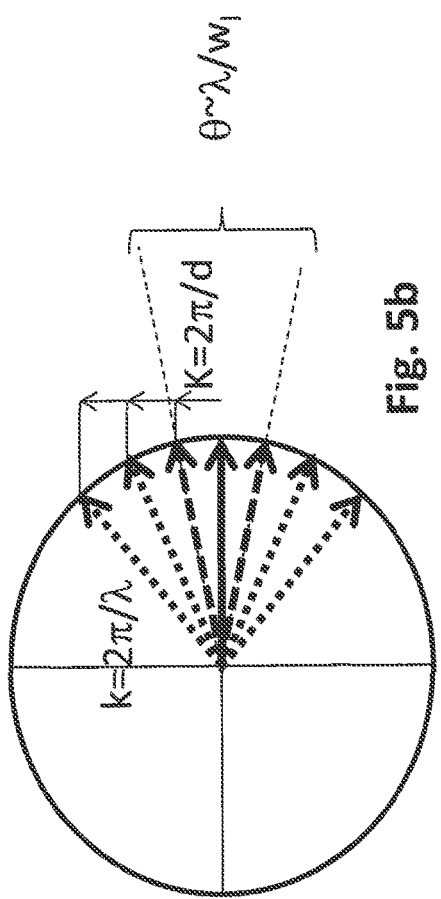

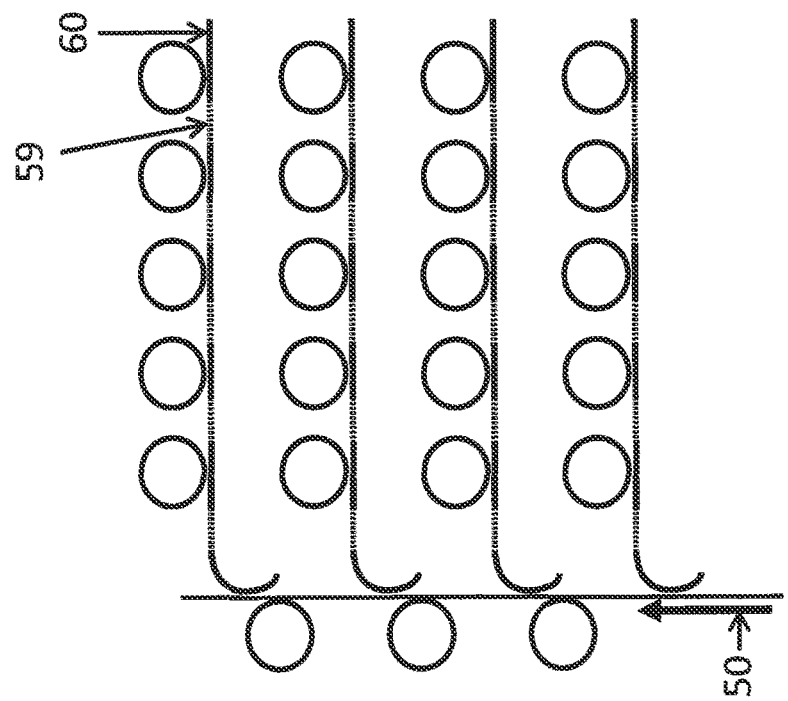
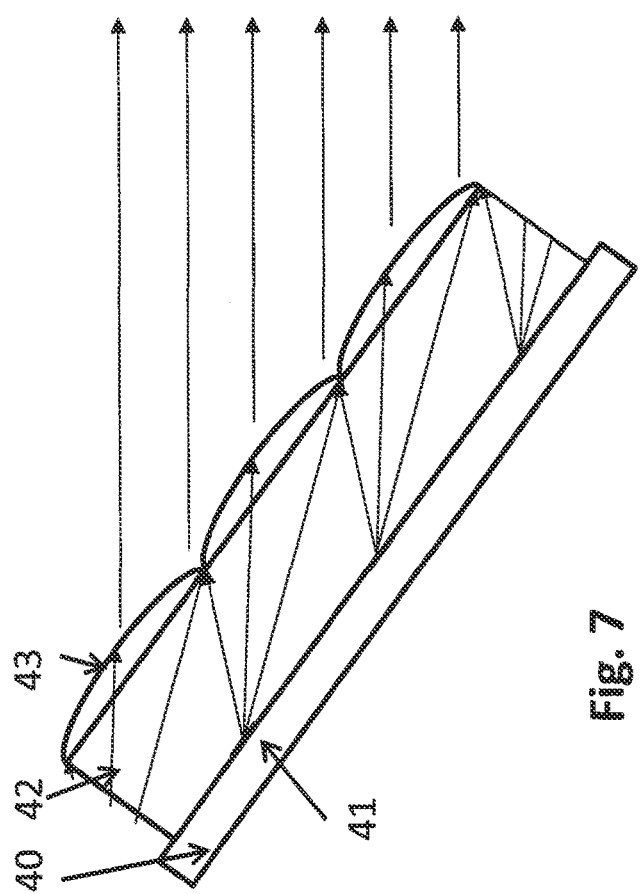

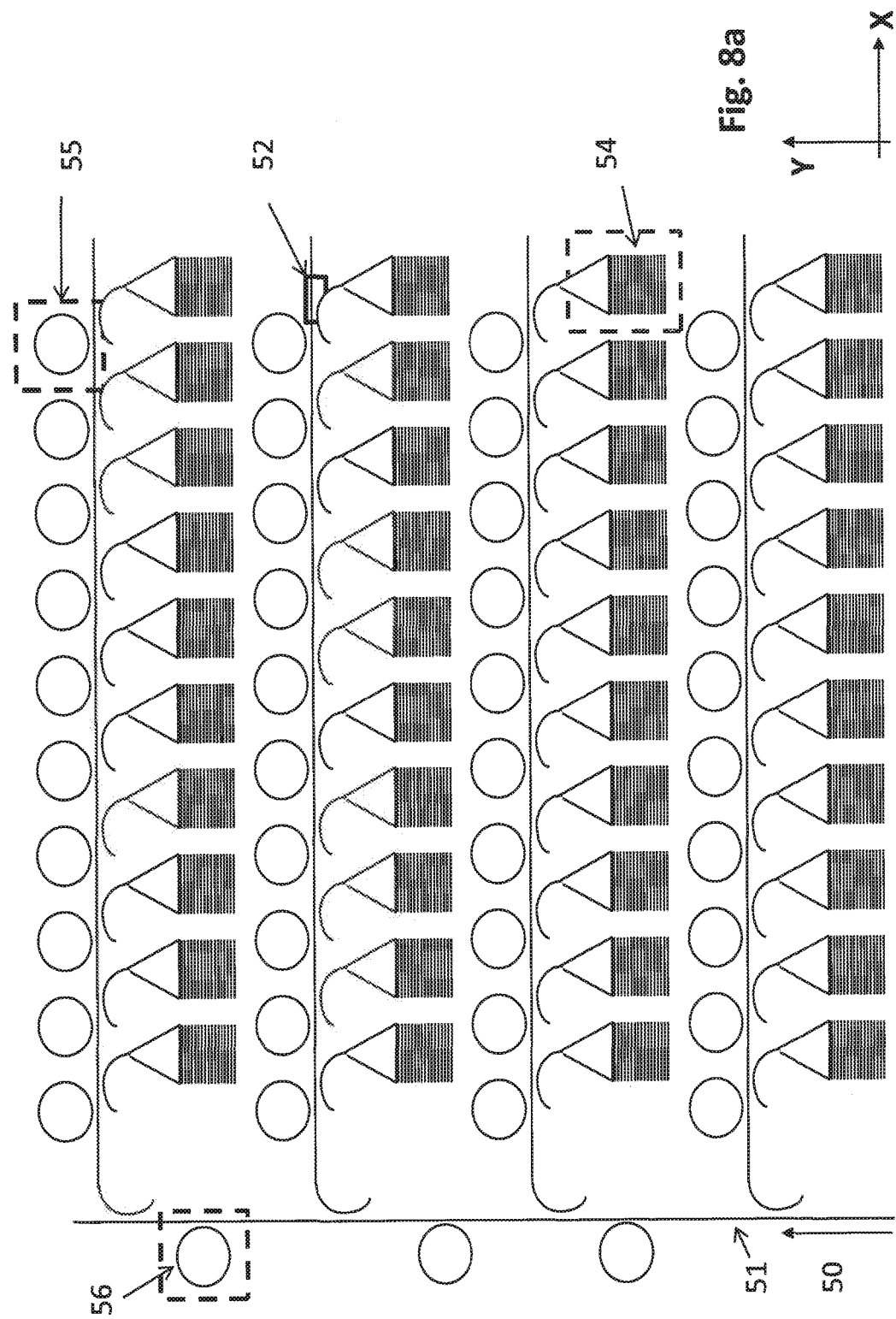

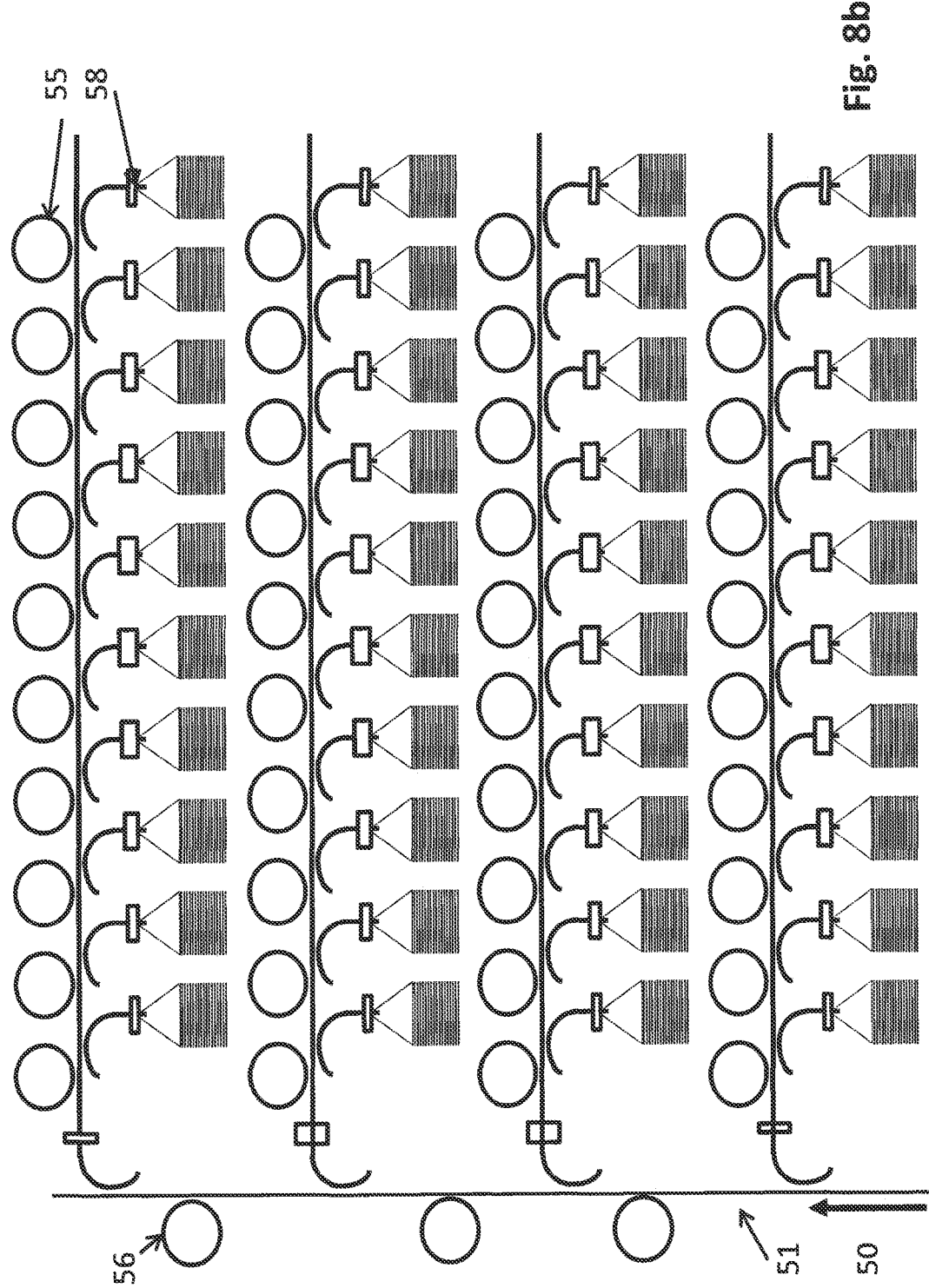

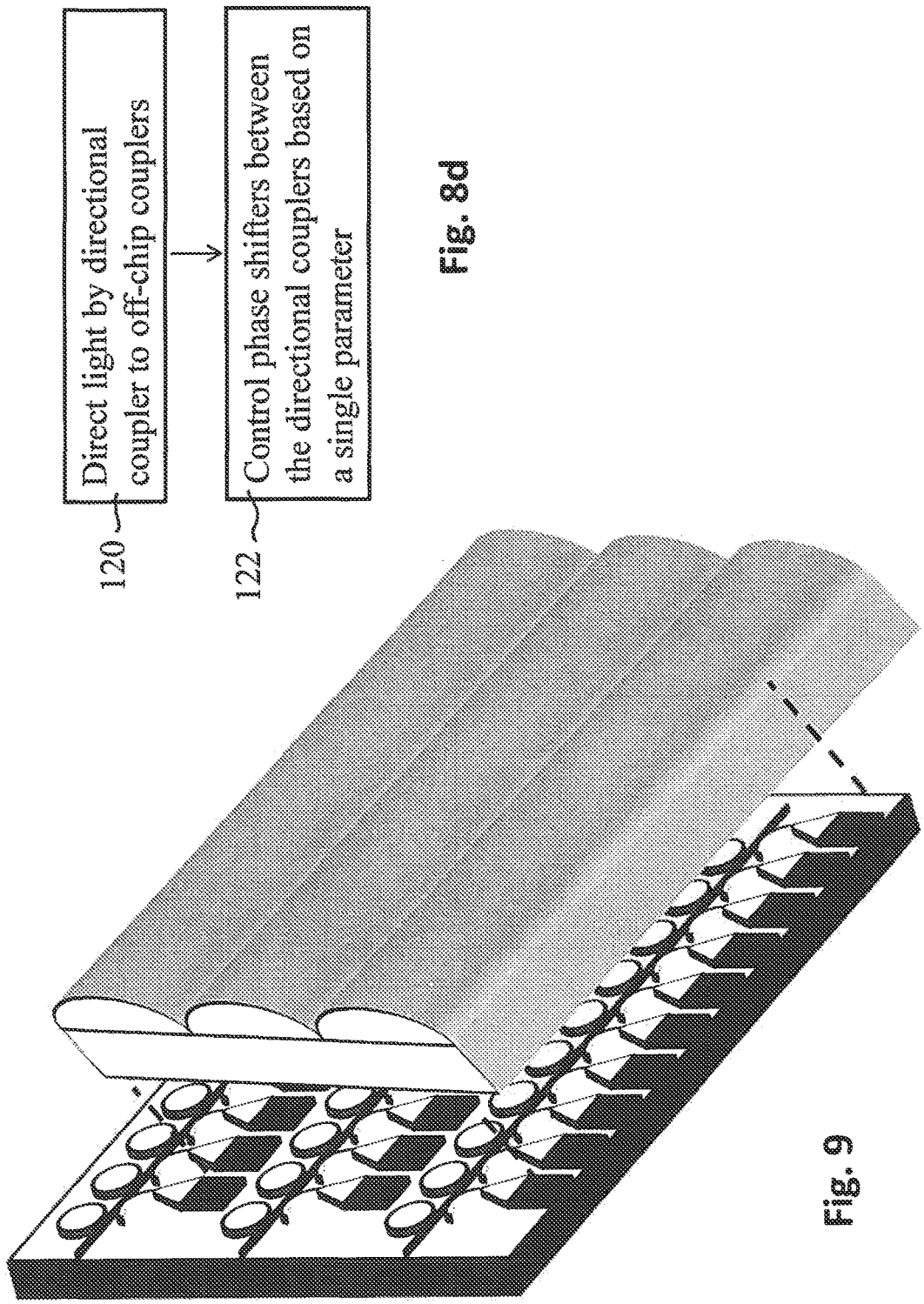

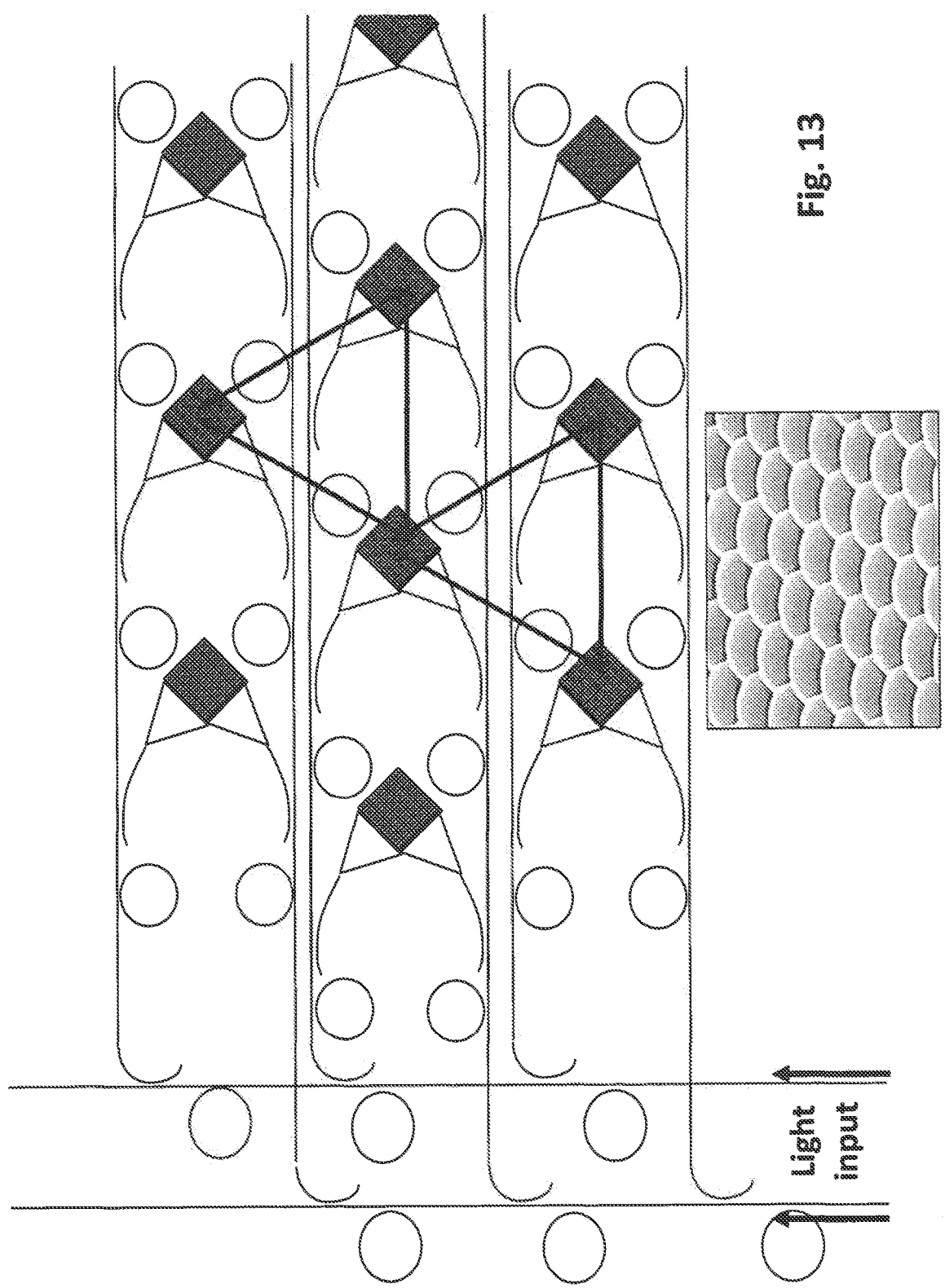

OPTICAL BEAMS

RELATED APPLICATION

This application was originally filed as PCT Application No. PCT/IB2013/056258 filed Jul. 30, 2013.

This disclosure relates to optical beams and more particularly to producing and/or receiving optical beams using phased arrays.

Optical beams can be used for various purposes. For example, optical beams can be used for communications in free space. In optical communications information is transferred using light as the physical medium between devices. The devices can be for example fixed and/or mobile communication devices, base stations and other access points, servers, machine type devices, and so on. Optical links can be used for communication of various types of information, for example for communications of control and user information, and for various applications such as payment applications, communication applications, security applications and so on. An optical beam can be directed to a particular target. Directionality of optical communications allows a device to selectively communicate with another device out of several devices in the vicinity. A directional optical link is a prerequisite for example for techniques such as Quantum Key Distribution (QKD) enabling unconditionally secure communication.

To establish a directional optical link between two optical modules a module needs to adjust i.e. steer the direction of its beam, if it operates as an emitter, or its field of view, if the module operates as a receiver. Typically steering of directional free-space optical (FSO) beam is done by moving macroscopic elements, e.g. lenses, mirrors, and/or the whole module. This can set speed limitations, be a cause of sensitivity to shocks and/or vibrations, add bulky elements to the apparatus and so on.

Integrated photonic phased arrays composed of a multiple of phase-controlled pixels are considered as an alternative to moving elements. Photonic phased arrays are considered a promising approach to steer light in free space, in particular because they can be provided without moving parts directly from an integrated optics chip. However, application of phased arrays to beam steering has so far been prevented because they emit in multiple orders of diffraction. The phased arrays can also have a very limited angle-tuning range. A tuning range is commonly understood as the range of angles, or maximum deflection, in which the light can be directed. Also, the phase of each pixel of the array is adjusted individually. The applicability of phased arrays for directional communications may also be limited in certain applications because they can be polarization sensitive.

It is noted that the issues discussed here are not limited to any particular apparatus and application but may occur in any context where phased arrays are used for communication of optical beams.

Embodiments of the invention aim to address one or several of the above issues.

In accordance with an aspect there is provided an apparatus for producing and/or receiving an optical beam, comprising a phased array on a chip comprising phase shifters and off-chip couplers to provide phase controlled pixels, and an optical system arranged in front of the phased array, the optical system being configured to concentrate light from the phased array and/or expand a received beam of light for input into the phased array.

In accordance with another aspect there is provided a method for producing an optical beam, comprising emitting light by phase controlled pixels of a phased array on a chip, wherein the pixels are provided by phase shifters and off-chip couplers, and guiding the light from the phase controlled pixels through a light concentrating optical system.

In accordance with a more detailed aspect the diffraction orders of the emitted light are reduced by at least one microlens and the emitted light is magnified by a reverse beam expander.

In accordance with yet another aspect there is provided a method for receiving an optical beam, comprising using phase shifters and off-chip couplers to provide a phase controlled pixels of a phased array on a chip, and guiding the optical beam to the phase controlled pixels through a beam expanding optical system arranged in front of the phased array.

In accordance it an aspect the optical system comprises a confocal beam expander. The beam expander can be provided by at least one converging lens and at least one diverging lens, by at least two converging lenses, by a prism beam expander, or by a grating arrangement. The optical system may comprise at least one microlens arranged to reduce the number of diffraction orders of light emitted by the phased array.

Control of the phase of the pixels on the array can be arranged to be provided in at least one direction by means of a single parameter. The phase of all pixels of the array may be controlled in two orthogonal directions based on respective two parameters. Control of the focus of the pixels on the phased array may also be arranged to be provided based on one parameter.

The focal length of the at least one microlens may approximately equal the ratio of the distance between off-chip couplers and the divergence of the off-chip couplers.

The phase shifters may be arranged between the off-chip couplers so that each phase shifter adds the same phase between each consecutive off-chip coupler. Additional phase shifters may be provided before the pixels.

The apparatus may comprise at least one cylindrical lens and/or at least one spherical lens.

The off-chip coupler may be provided directly as a periodic structure on a waveguide of a phased array.

Off-chip couplers configured to provide polarization diversity may also be provided.

A device such as a mobile communication device and/or a stationary or non-stationary device arranged to implement the embodiments can also be provided. A system comprising at least one of such device can be provided.

A computer program comprising program code adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

Figure 14:
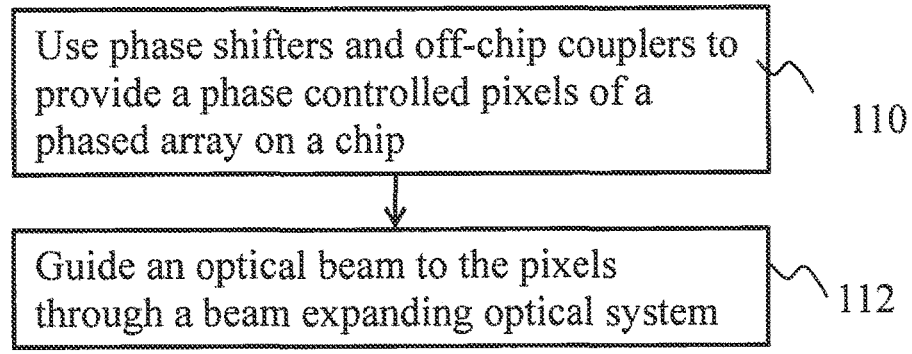
Figure 4:
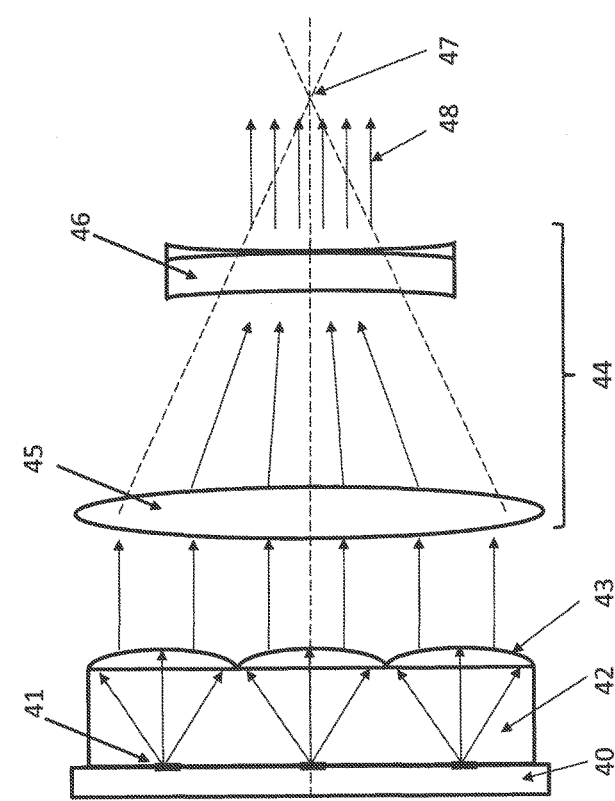
Figure 6B:
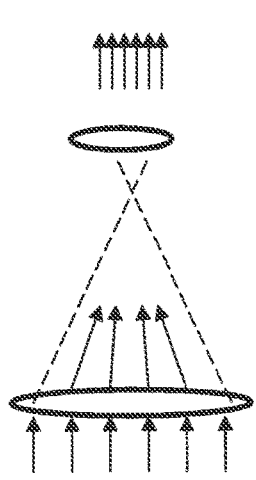
Figure 6C:
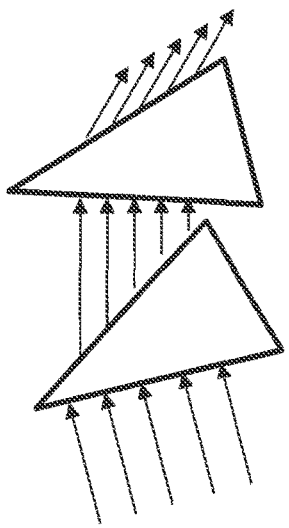
Figure 6D:
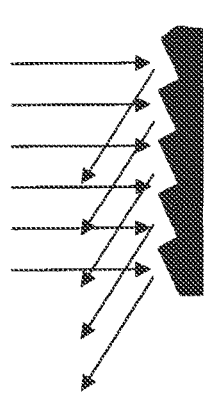
Figure 6A:
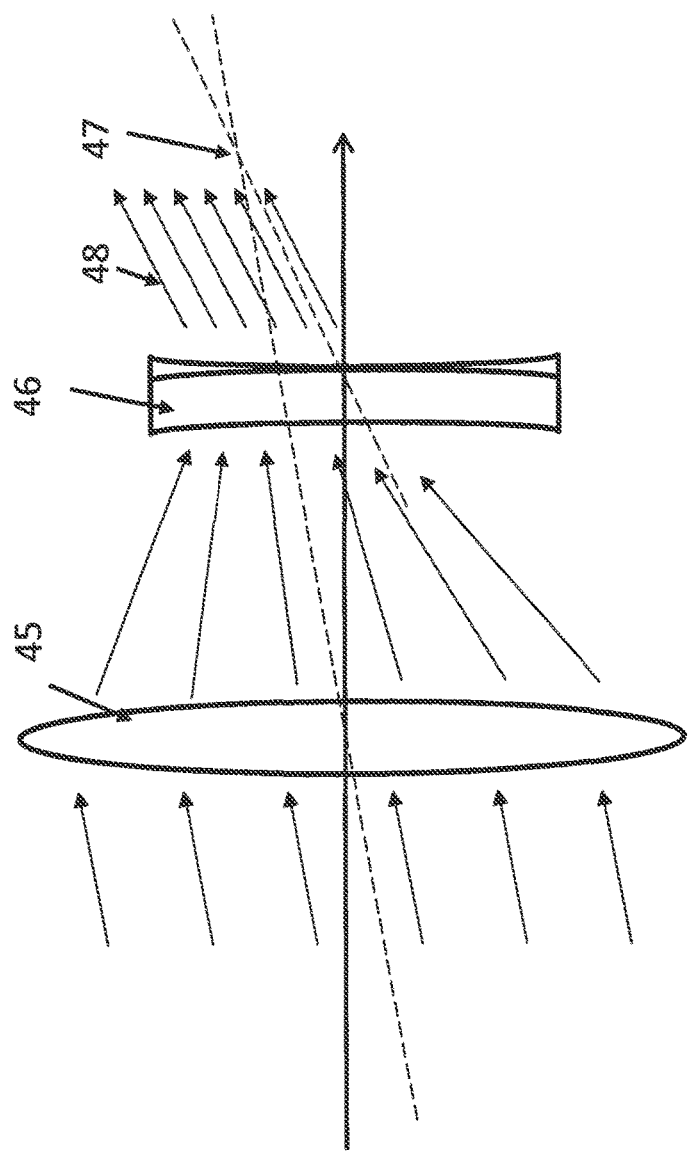

FIG. 4 shows a phased array with an optical system comprising a microlens and a confocal beam expander, FIGS. 5*a* and 5*b* show diffraction orders without and with microlenses, respectively, FIGS. 6a to 6d show different possibilities for beam expanders, FIG. 7 shows the principle of an optical system where grazing emission is used instead of a beam expander, FIGS. 8a to 8d show examples for phase shifters and off-chip couplers, FIG. 9 shows an example of a phased array with cylindrical microlenses, FIGS. 10, 11, 12a and 12b show examples of arrangements with polarization diversity, FIG. 13 shows an example of a possible phased array symmetry, and FIG. 14 shows a flowchart for operation at a receiving device.

Figure 1:
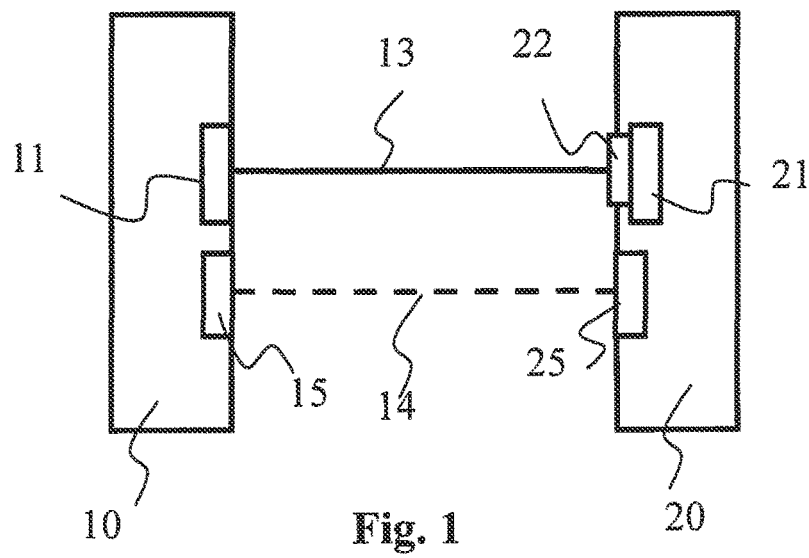
FIG. 1 shows two communicating devices.

In the following certain exemplifying embodiments are explained. An example of possible applications is use of directional optical beams for signal transmission between two devices. FIG. 1 shows a system comprising devices 10 and 20 communicating via an optical link 13. More particularly, FIG. 1 shows an emitting or transmitting device 10 and a receiving or target device 20. The devices are provided with optical modules configured to send and receive optical signals. The receiving device 20 can comprise a detector apparatus 21 with a field of view 22. The receiving device may be provided with a possibility to adjust the direction of its field of view. The emitting device 10 can be provided with light emitting apparatus 11 that produces the optical beam 13 directed to the target area on the receiving device. The beam is typically directed to the optical aperture 22 by emitting in an appropriate direction with an appropriate focus. The beam enters the receiver apparatus through the aperture providing the field of view (FOV) of the receiving device. The field of view aims to encompass the emitter e.g. by being steered to look in an appropriate direction with an appropriate focalization.

A radio frequency (RF) wireless link 14 may also be provided in certain applications between devices 10 and 20, should this be required by a particular application for example for communication of feedback information or other information. The RE link or other link for e.g. feedback and/or other communications such as communications of data after authentication via the optical link can be provided directly between the devices or via e.g. a cellular system or a wireless local area network (WLAN). The devices can be provided with a communication subsystem 15, 25 for the radio communications, for example with appropriate radio apparatus to facilitate wireless communications. It is noted that a communication channel between can also be provided based on other technologies.

The communications may be provided for example between two mobile devices or between a mobile device and a stationary terminal device. A mobile device can be e.g. a handheld or otherwise portable device. A mobile device of a user for communications is often referred to as user equipment (UE) or terminal. A mobile device may be provided by any device provided with optical communication apparatus for communication on an optical channel. The mobile device may also be capable of sending signals to and/or receiving wireless signals on a channel provided for example by a cellular system and/or a local wireless system. Non-limiting examples of mobile devices include a mobile station (MS) such as a mobile phone or what is known as a 'smart phone', a portable computer such as a laptop, tablet or a personal data assistant (PDA) provided with wireless communication capabilities, other portable device such as wearable wireless devices integrated with eyewear, helmets, hats, clothing and so on, universal serial bus (USB) sticks with wireless capabilities, modem data cards or any combinations of these or the like.

Figure 2:
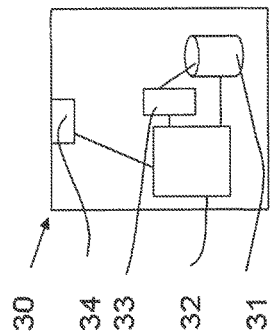
FIG. 2 shows an example of a control apparatus for a transmitting device.

Devices capable of communications on optical links can be controlled by at least one appropriate controller apparatus so as to enable operation thereof and control various aspects of the communications. The control apparatus can be interconnected with other control entities. FIG. 2 shows an example of control apparatus 30 capable of operating in accordance with the embodiments, for example to be coupled to and/or for controlling the operation of modules 11 and 21 of devices 10 and 20. The control apparatus can be configured to provide control functions in association with determination of information, generation and communication of information between the various entities and/or control functions of the transmitting and/or receiving apparatus as explained below. The functions can be provided by means of the data processing facility thereof in accordance with the certain embodiments described herein. For this purpose the control apparatus comprises at least one memory 31, at least one data processing unit 32, 33 and an input/output interface 34. The control apparatus can be configured to execute an appropriate software code to provide the control functions. For example, the control apparatus can provide required functionality for control of determinations, steering, emitting, detecting, decoding/encoding and/or other functionalities devices 10 and 20 and/or the optical modules thereof may have been provided with. The control apparatus and functions may be distributed between a plurality of control units. The data processing, storage and other relevant control apparatus may be provided on an appropriate circuit board and/or in chipsets.

The following discusses some examples of techniques where phased arrays can be used efficiently for optical communications between devices by concentrating light emitted from a device in a single direction while maintaining a wide angular tuning range. For example, usability of the phased arrays for optical communications can be enhanced if the light can be concentrated in a single order of diffraction. In accordance with an example this can be achieved by an apparatus comprising on-chip arrangements of phase shifters and vertical off-chip couplers constituting a phased array and an optical system provided by a microlens array spaced from the chip by a distance equal to their focal length. The optical system may also comprise a magnifying system, for example a beam expander used in reverse. Such apparatus allows concentration of the light in mostly a single mode while conserving a wide tuning range. When transmitting, a wide collimated beam is reconstructed into a narrower collimated beam. That is, the cross-sectional area of the beam can be reduced by the reverse beam expander.

Figure 3:
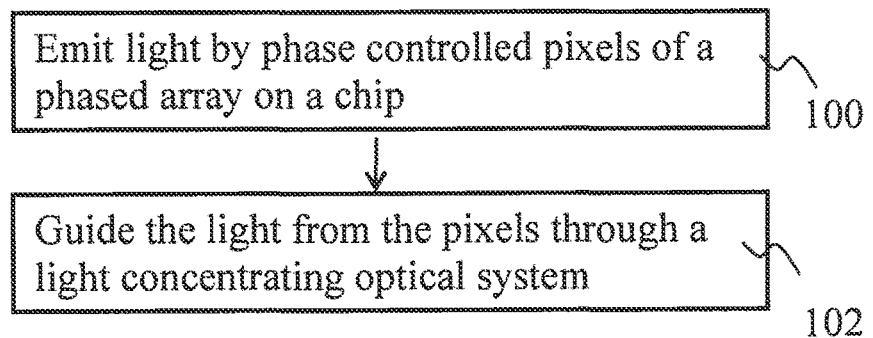
FIG. 3 is a flowchart in accordance with an embodiment.

A method for providing an optical beam by a transmitting device is shown in FIG. 3. Light is emitted at 100 by phase controlled pixels of a phased array on a chip. The pixels are provided by phase shifters and off-chip couplers. The light is then guided at 102 from the phase controlled pixels through at least one optical component of an optical system.

FIG. 4 shows a more detailed example of a phased array 40 with an optical system comprising a microlens array 43 and a reverse beam expander 44. In on-chip phased arrays space is provided between each pixel in order to fit the waveguides and phase shifters in. Because of this the light may become distributed into many orders of diffraction. Microlenses 43 are provided in the apparatus to reduce the number of diffraction orders by correcting the distributed emission by phase controlled off-chip couplers 41 from the phased array 40. By means of this collimated light can be produced. An array of microlenses 43 in front of each emitter at a distance equal to the focal length of the microlenses is shown on FIG. 4 for this purpose.

In accordance with a possibility a spacer 42 between the phased array 40 and the microlens 43 is provided. The spacer can be made of the same material as the lenses.

Example of diffraction orders without microlenses is shown in FIG. 5a. Parameters are d=distance between couplers, λ=light wavelength, K=coupler array wavevector, k=light wavevector, and $w_e$=coupler width. In this case output coupler divergence $\theta \sim \lambda/w_e$. The number of modes within the divergence of the emitters is about $d/w_e$.

FIG. 5b shows the situation when microlenses are provided. In here parameter $w_l$ denotes the width of the microlens. The number of modes within the divergence of the emitters is about $dl/w_l$. If the lenses fill all the space, $w_l$=d, it is possible to have only one diffraction mode. Divergence after the microlenses is $\theta \sim \lambda/w_l$.

As a rule of thumb, the number of diffraction orders in one direction is in the order of the ratio between the width of the off-chip coupler and the distance between each coupler.

The focal length of the microlenses may be chosen as the product of the couplers divergence by the distance between each coupler so that the light fills substantially the whole plane. A microlens has the effect of concentrating most of the light in single diffraction order, thus addressing a shortcoming of on-chip phased arrays.

Microlenses can decrease the tuning range. This can be addressed by a magnifying system. A magnifying system can be provided, for example, by a beam expander that operates in reverse. In FIG. 4 a confocal beam expander 44 comprises two lenses 45 and 46. In the shown reverse beam expander arrangement the first lens 45 directs the emitted light towards a focal point 47 and the second lens 46 produces parallel light components 48. As shown, the magnifying system can be used to decrease the beam diameter after emission from the phased array, as emitted by the mircolenses and increase the tuning range.

In accordance with a non-limiting example, the beam transmitted from a device is decreased to be in the order of 1 mm in diameter. The size of a desired beam depends on the application, though, and can be of a different order than this example.

Most phased arrays are wider than necessary but have a small angular tuning range. The reverse beam expander increases the angle of the beam. This also decreases the beam diameter as a byproduct of the angular magnification. The beam expander 44 thus allows for optimization of those characteristics. This part of the optical system can be similar to a beam expander used in reverse or a telescope. The magnifying optics 44 has three correlated effects, i.e. the optics can be used to reduce the beam diameter, to increase divergence of the beam and to increase the tuning range. The principle of a beam expander as well as several different implementations thereof are shown in FIGS. 6a to 6d.

The optical system in front of the phased array thus concentrates the light. In this context the "concentrating" can be understood to mean concentrating into a fewer or even a single diffraction mode by the microlenses and/or reducing the beam diameter by the reverse beam expander as a result of the magnifying effect.

The same effect can be obtained also otherwise without a beam expander. FIG. 7 shows an example of an optical system configuration where the magnifying optics is replaced by use of grazing emission. Grazing emission can be produced by adjusting the period of the grating couplers. Off-chip couplers with a tilted/grazing emission can be used. This can be provided e.g. in the case of grating couplers by using an appropriate periodicity. Use of such of-chip couplers has the advantage of saving the space otherwise occupied by a beam expander. This option is considered to be most suitable when the angular tuning range needs to be increased in only one direction.

Chip-based phased arrays can be provided for example on a Silicon On Insulator (SOI) platform. With this technology, off-chip couplers are usually made of gratings. For the phase shifters, however, other and different techniques can also be used to make them smaller, faster and more energy efficient. The phase shift can be induced by a heater, carrier depletion, or electro-optic materials deposited on the silicon. The effect can be enhanced by using a micro-ring although other techniques such as slow light periodic structures are also possible. In the below described examples and FIGS. 8 to 11 the phase shifters are represented by rings.

The phased array itself can be arranged to allow control of the phase of every pixel thereof with only two control parameters corresponding to the two directions of steering. A third parameter may be used for control of the focus. Also, the phased array can be arranged so as to combine polarizations.

FIG. 8a shows a possible configuration of an off-chip coupler, phase shifters and directional couplers. In this configuration, light 50 is guided in a main waveguide structure 51 in Y-direction and X-direction. A small part of the light is extracted by weak directional couplers 52 to direct the light to off-chip couplers 54. Phase shifters in Y-direction and X-direction, 55 and 56, respectively, are positioned between the directional couplers 52 leading to the off-chip couplers 54. That is, a phase shifter 55, 56 is placed, in the path of travel of light, before each directional coupler 52 guiding light to an off-chip coupler 54. This allows control of all off-chip couplers at once based on a single parameter in each direction. The phase shifters enable each pixel to emit in a single direction with a different phase. The difference provided by the phase shifters between the phases of the pixels can be the same. An appropriate control parameter for controlling the phase difference between the pixels in a direction can be based on for example voltage or current, depending on the technique.

In the example of FIG. 8a the pixels are fitted in a compact manner in the X-direction meaning that the light distribution in this direction can be considered to be within tolerable limits. This in turn means that the microlenses are only needed for the other, i.e. Y-direction. In this case it may not be necessary to have spherical converging lenses but cylindrical lenses can be sufficient. An example of use of cylindrical microlenses is shown in FIG. 9.

In order to increase the tuning range it is possible to use off-chip couplers with tilted emission or add a beam expander made of cylindrical lenses, prism or gratings.

FIG. 8b shows a configuration where additional phase shifters 58 are provided in association with each pixel allowing adjustment of beam focus. The arrangement can be similar to FIG. 8a in regards to X and Y phase shifters 55 and 56 and adjustment of the phases in at least one of these directions. In addition to these phase shifters the additional or second phase shifters 58 are provided for adjusting the focus. In this example the additional focusing phase shifters are provided, on the travel path of light, after the directional couplers and before the pixels.

If the phase shifters all have the same dimension a different voltage would need to be applied to each of them to mimic the shape of a lens. However, the dimension of each phase shifter can be chosen so that the ensemble of those phase shifters mimics the shape of a lens (e.g. spherical, aspherical, Fresnel). This enables control of the phase shifters by a single voltage/current signal. The dimensioning of the phase shifters can be provided based on e.g. spherical/parabolic dependence. Tuning the phase shifts can be kept equivalent to that of a lens, while only the focal length of that lens is varied.

FIG. 8c shows an arrangement where weak off-chip couplers 59 are directly etched in a waveguide 60. In this arrangement off-chip emission can come directly from the waveguide with the help of a periodic structure (e.g. grating, photonic crystal). The coupling strength of those structures is advantageously kept weak.

FIG. 8d illustrates the general principles for control based on a single parameter. More particularly, in a phased array light is directed at 120 to off-chip couplers by directional couplers configured to direct light to the off-chip couplers in at least one direction. Phase shifters provided between the directional couplers, and thus before each pixel, in the at least one direction are controlled at 122 based on a single control parameter.

Figure 10:
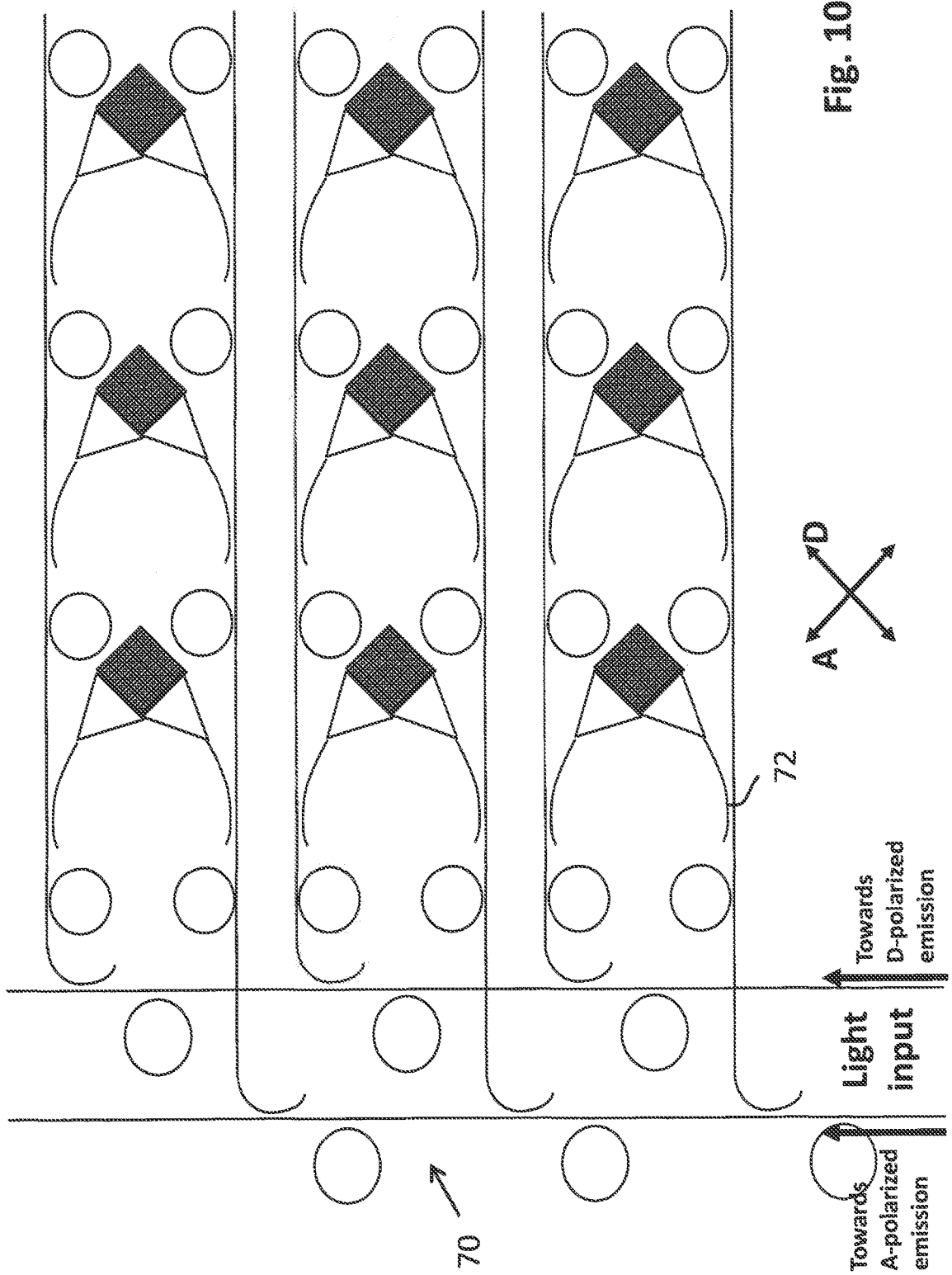

In the above examples the emission is provided in one polarization, along the coupler gratings. The gratings are illustrated by the parallel lines in FIGS. 8a and 8b. Polarization diversity can be introduced where optical signal is divided into separated polarizations. For example, separation can be provided by using a 2D grating with two different inputs corresponding to the two polarizations. FIG. 10 shows an exemplifying arrangement of such 2D gratings where A and D polarized emissions are provided in waveguide arrangement 70. In this case the couplers 72 are evenly spread in X and Y directions, thereby providing adaptation to an array of spherical microlenses and a beam expander with spherical lenses.

Figure 11:
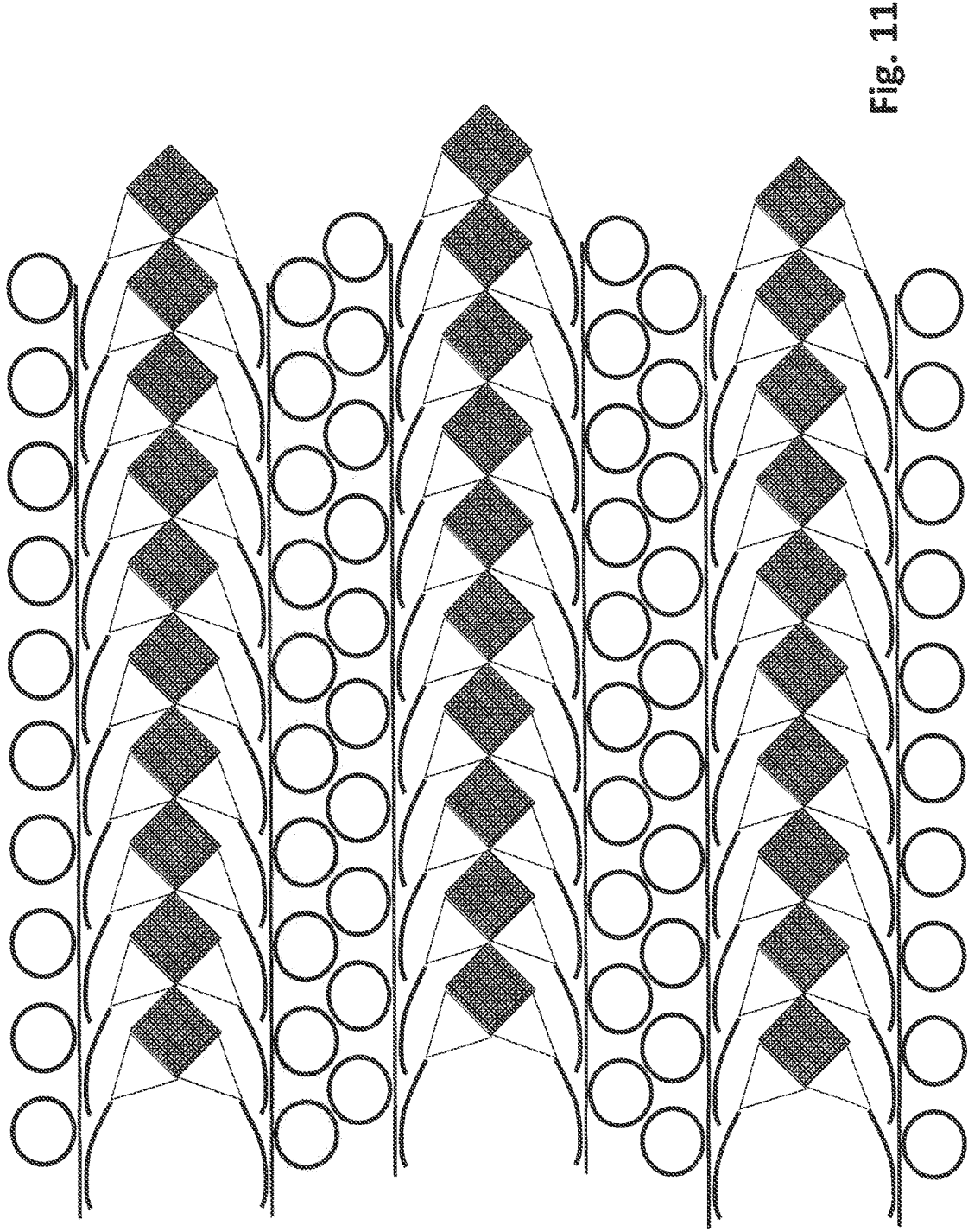

FIG. 11 shows an array of similar couplers to those of FIG. 10 but in an arrangement that is better adapted for use with a cylindrical microlens array.

Figure 12A:
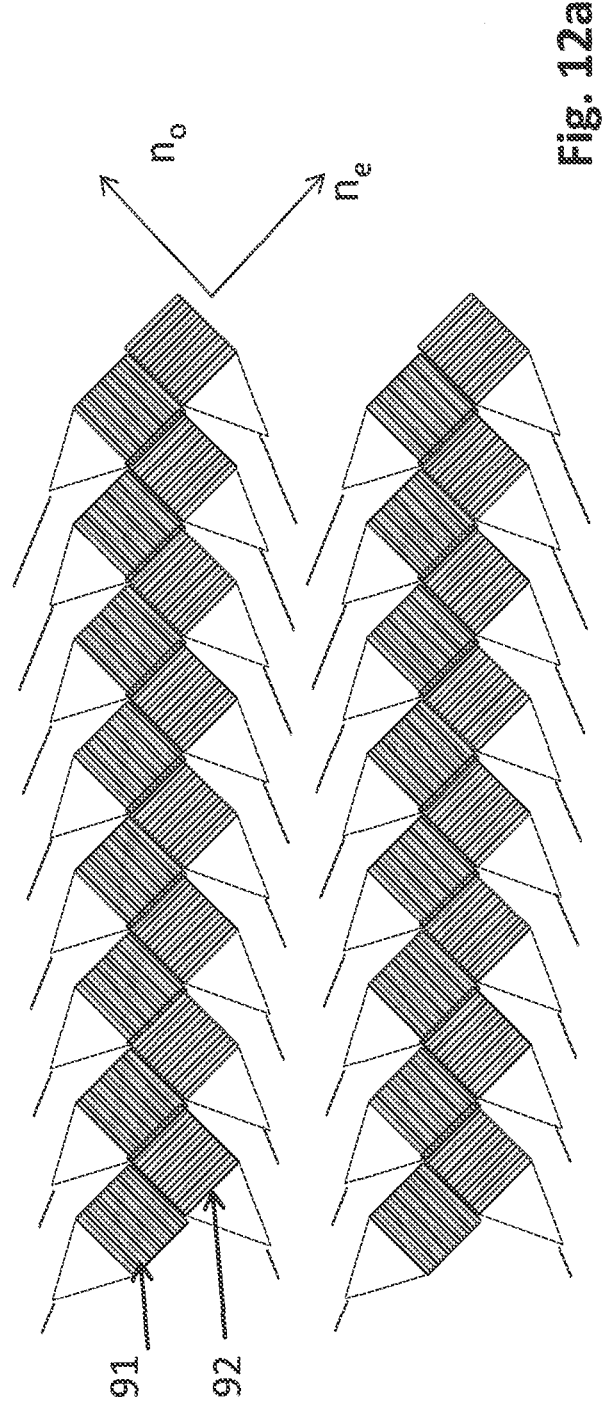

2D couplers can be in certain applications less efficient than single polarization couplers. Thus polarization diversity may in certain cases be more advantageously be provided with single polarization gratings. FIG. 12a shows an example for arrangement of single polarization gratings allowing polarization diversity. Gratings 91 and 92 in two different polarization can be arranged in the structure as shown. Orientations of birefringent material are shown by arrows $n_o$ and $n_e$. Birefringence is optical property of a material having a refractive index that depends on the polarization and propagation direction of light. Both polarizations are emitted exactly in the same direction because the periodicity is the same. However, when the light is steered, the relative efficiency of the two polarizations might vary because the average position of the pixel with respect to the lens array is slightly different for each polarization. Use of a birefringent crystal with an orientation shown on FIG. 12a can have the effect shown in FIG. 12b. Different polarizations propagate in different directions and therefore can be directed towards two different pixels. Similarly, different polarizations can be combined from different pixels. The birefringent material 93 induces a "walk-off" between the two polarizations. Such arrangement has an application as a polarizer where an input light beam with unknown polarization is separated into two separate beams with orthogonal polarizations.

Figure 12B:
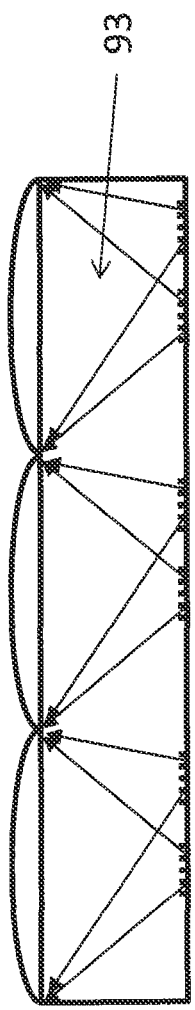

The phenomenon shown in FIG. 12b can be used for an optical system with spherical or cylindrical lenses, while the arrangement shown in FIG. 12a is rather suited for cylindrical lenses.

A more compact arrangement of microlenses than what is available by a square lattice can be provided by a hexagonal lattice. Such a disposition may be more efficient in collecting the light from the emitters. All the above described configurations can be adapted to a hexagonal symmetry as shown in FIG. 13. The phases of the pixel producing elements need to be adjusted accordingly.

Due to the symmetrical nature of optics a system emitting in one direction is able to receive light from that direction. Thus the principles described above can be used in both directions i.e. steer an emitted beam as well as steering the field of view of a receiver. In view of the latter option a reference is made to the flowchart of FIG. 14 showing a method for receiving at 110 an optical beam by using phase shifters and off-chip couplers to provide a phase controlled pixels of a phased array on a chip. The optical beam is guided at 112 to the phase controlled pixels through at least one optical component in front of the phased array.

The above described principles can be applied for example to ultra high-speed data transfer between devices within line of sight. At least one of the devises can be a mobile device. Unconditionally secure communications can be provided for example in relation to payments and other secure applications between a mobile device and a server. The unconditionally secure communications can be based on quantum communication, for example based on quantum key distribution (QKD). Other examples of possible applications are light detection and ranging (LIDAR), three-dimensional holography and biomedical sciences. An advantage is that no mechanical parts are necessarily involved in beam steering. The number of diffraction orders can be reduced. Tuning range of phased arrays can be increased.

The arrangement is controllable by two parameters, e.g. two voltages, instead of one parameter per pixel. In accordance with a further aspect there is provided apparatus and method for enabling control of phase in a direction and/or focus of a plurality of pixels on a phased array based on a single parameter.

A phased array apparatus for providing phase controlled pixels comprises off-chip couplers, directional couplers configured to direct light to the off-chip couplers in at least one direction and phase shifters provided between the directional couplers in the at least one direction, wherein the phase shifters in the at least one direction are controlled based on a single control parameter.

A phased array apparatus as defined in above paragraph, configured such that each pixel emits light with a different phase, the difference between the phases of the pixels being the same.

A phased array apparatus as defined in either of the above two paragraphs, wherein the phase of the pixels is configured to be adjusted in two orthogonal directions based on two control parameters.

A phased array apparatus as defined in any of the above three paragraphs, wherein second phase shifters are provided in association with the off-couplers for adjustment of focus.

A phased array apparatus as defined in the above paragraph, wherein each second phase shifter is dimensioned such that the ensemble thereof mimics the shape of a lens.

A phased array apparatus as defined in the above paragraph, wherein dimensioning of the second phase shifters is provided based on spherical and/or parabolic dependence.

A phased array apparatus as defined in any of the above six paragraphs, wherein the control parameter is based on voltage or current.

A method for providing phase controlled pixels on a phased array, comprising directing light to off-chip couplers by directional couplers configured to direct light to the off-chip couplers in at least one direction, and controlling phase shifters provided between the directional couplers in the at least one direction based on a single control parameter.

A method as defined in above paragraph, wherein each pixel emits light with a different phase, the difference between the phases of the pixels being the same.

A method as defined in either of the above two paragraphs, comprising adjusting the phase of the pixels in two orthogonal directions based on two control parameters.

A method as defined in any of the above three paragraphs, comprising adjusting focus by second phase shifters provided in association with the off-couplers.

A method as defined in the above paragraph, wherein the ensemble of each second phase shifter mimics the shape of a lens.

A method as defined in the above paragraph, wherein dimensioning of the second phase shifters is provided based on spherical and/or parabolic dependence.

A method as defined in any of the above six paragraphs, comprising using voltage or current as the basis of the control parameter.

According to an example appropriate apparatus or means are provided for producing and/or receiving an optical beam, comprising a phased array on a chip comprising phase shifter means and coupling means for provide phase controlled pixels, and optical means arranged in front of the phased array, the optical means being for concentrating light from the phased array and/or expand a received beam of light for input into the phased array.

It is noted that whilst embodiments have been described using a mobile communications device as one example, similar principles can be applied to any other device capable of emitting and/or receiving optical beams. Therefore, although certain embodiments were described above by way of example with reference to certain exemplifying devices and technologies, the principles can be applied to any other suitable forms of devices than those illustrated and described herein.

The required data processing apparatus and functions at the relevant devices may be provided by means of one or more data processors. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

The herein described examples can be provide certain advantages. For example, ultra-high-speed file transfer between mobile devices can be provided. QKD can be taken into use as a commercial application.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. An apparatus comprising:
a phased array on a chip comprising phase shifters and off-chip couplers to provide phase controlled pixels, and
an optical system arranged in front of the phased array, the optical system being configured to concentrate light from the phased array and/or expand a received beam of light for input into the phased array;
wherein the phase of substantially all pixels of the array is controlled in two orthogonal directions based on respective two parameters.

2. An apparatus according to claim 1, wherein the optical system comprises:
at least one microlens arranged to collimate light emitted by the phased array, and
a reverse beam expander arranged to magnify the light beam output from the at least one microlens.

3. An apparatus according to claim 1, wherein the optical system comprises a confocal beam expander, the beam expander being provided by at least one converging lens and at least one diverging lens, by at least two converging lenses, by a prism beam expander, or by a grating arrangement.

4. An apparatus according to claim 1, wherein the optical system comprises at least one microlens arranged to reduce the number of diffraction orders of light emitted by the phased array.

5. An apparatus according to claim 1, wherein control of the phase of the pixels on the array is arranged to be provided in at least one direction by means of a single parameter.

6. An apparatus according to claim 5, wherein the control of the focus of the pixels on the phased array is arranged to be provided based on one parameter.

7. An apparatus according to claim 1, wherein the focal length of the at least one microlens approximately equals the ratio of the distance between off-chip couplers and the divergence of the off-chip couplers.

8. An apparatus according to claim 1, wherein the phase shifters are arranged between the off-chip couplers so that each phase shifter adds the same phase between each consecutive off-chip coupler.

9. An apparatus according to claim 1, comprising additional phase shifters before the pixels.

10. An apparatus according to claim 1, comprising at least one cylindrical lens and/or at least one spherical lens.

11. An apparatus according to claim 1, wherein the off-chip coupler is provided directly as a periodic structure on a waveguide of the phased array.

12. An apparatus according to claim 1, comprising off-chip couplers configured to provide polarization diversity.

13. An apparatus according to claim 1, wherein the optical system comprises microlenses provided in a square lattice or hexagonal lattice.

\* \* \* \* \*